United States Patent [19]

Hammer

[11] 4,076,381
[45] Feb. 28, 1978

[54] ON LINE ELECTRO-OPTIC MODULATOR

[75] Inventor: Jacob Meyer Hammer, Plainsboro, N.J.

[73] Assignee: The United States of America as represented by the Secretary of the Navy, Washington, D.C.

[21] Appl. No.: 737,807

[22] Filed: Nov. 1, 1976

[51] Int. Cl.$^2$ ............................................. G02B 5/14
[52] U.S. Cl. ........................ 350/96.14; 350/162 R; 350/356; 350/96.17
[58] Field of Search ............... 350/96 C, 96 WG, 150, 350/160 R, 162 R

[56] References Cited

U.S. PATENT DOCUMENTS

| 3,614,198 | 10/1971 | Martin et al. | 350/96 WG |
|---|---|---|---|
| 3,674,335 | 7/1972 | Ashkin et al. | 350/96 WG |
| 3,883,221 | 5/1975 | Rigrod | 350/96 C |
| 4,018,506 | 4/1977 | Hammer | 350/96 C |

OTHER PUBLICATIONS

J. T. Boyd, C. S. Kuo, "Composite Prism-Grating Coupler for Coupling . . .," Applied Optics, vol. 15, No. 7, July 1976, pp. 1681-1683.

Primary Examiner—John K. Corbin
Assistant Examiner—Rolf Hille
Attorney, Agent, or Firm—Richard S. Sciascia; Harvey A. David

[57] ABSTRACT

An electro-optic modulator wherein a light waveguide is in the form of a film disposed on a prismatic substrate and beneath modulating electrodes. The substrate has opposite end faces disposed at predetermined angles to its longitudinal axis and cooperates with grating couplers on the waveguide to direct an entrance beam through the waveguide and to provide an exit beam along a predetermined path relative, e.g., parallel, to the entrance beam.

5 Claims, 3 Drawing Figures

ON LINE ELECTRO-OPTIC MODULATOR

BACKGROUND OF THE INVENTION

This invention relates to electro-optical modulators, and more particularly to improved waveguide coupling in such devices.

The modulation of light beams, particularly coherent light such as produced by a laser, has been accomplished through the use of electro-optic modulators wherein a varying voltage is used as the modulating signal. Such modulators are exemplified by U.S. Pat. Nos. 3,506,929 to A. A. Ballman, et al., and 3,656,836 to B. de Cremoux et al. As shown in the Ballman patent, a light transmitting substrate or wave guide formed of lithium tantalate (Li Ta $O_3$) crystal has electro-optic characteristics that effectively modulate light when subjected to an electrical field developed between electrodes carried by the substrate. In the manufacture of practical electro-optic modulators for laser beams, efficiency of coupling of light into and out of the wave guide substrate becomes important. One approach has been to use reflective gratings ruled in the wave guide surface to alter the light beam path. Small sizes of elements and critical entrance angles, however, make alignment procedures between the light source and the crystal substrate difficult and expensive. Moreover, the prior grating coupled modulators have not permitted the insertion of the modulator directly on line in a system. Accordingly, it would be desirable to provide an improved electro-optical modulator wherein alignment between the source and the substrate is not as critical as has been experienced heretofore, and which will permit direct "on line" incorporation in a system.

SUMMARY OF THE INVENTION

With the foregoing in mind it is a principal object of this invention to provide an improved electro-optical modulator useful in modulating laser beams, for example.

Another important object of the invention is the provision of a light modulator wherein the coupling of the light energy into and from a crystal substrate can be accomplished efficiently and without critical alignment procedures.

Yet another object is the provision of light modulators of the foregoing character that can be economically produced using readily available techniques.

Still another object is to provide an electro-optical modulator that is particularly compact and can be inserted "on-line" in an optical system.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
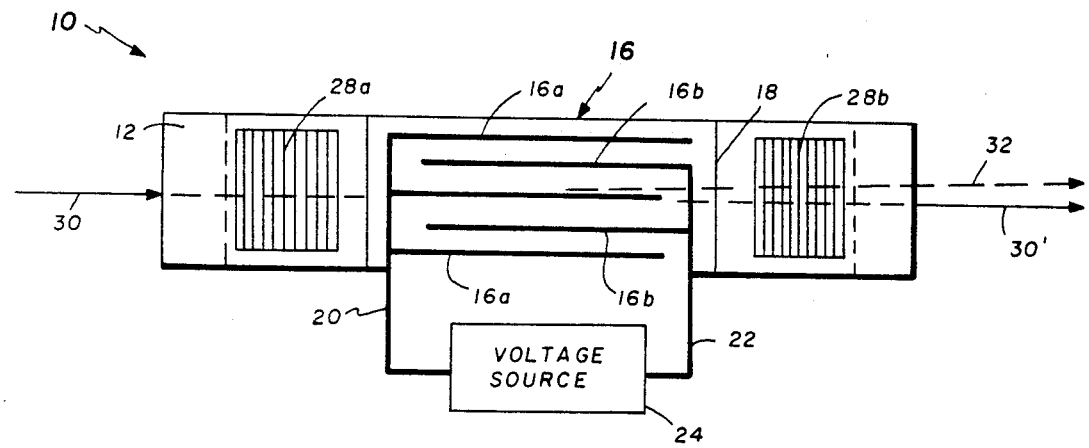
FIG. 1 is a plan view of an electo-optic modulator device embodying the invention.
Figure 2:
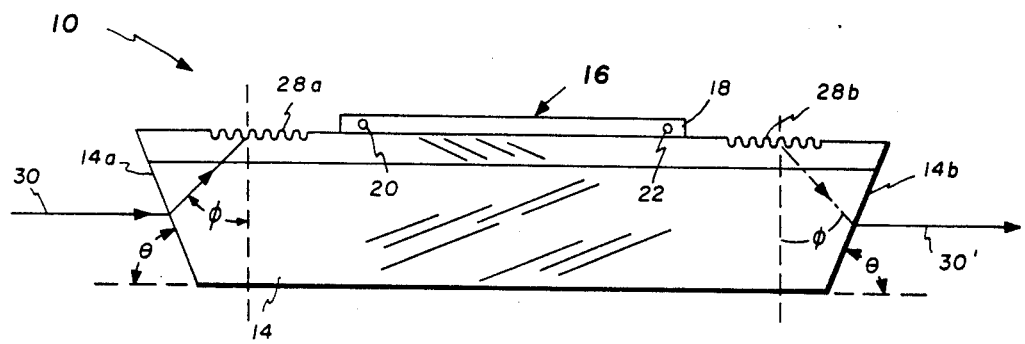
FIG. 2 is a side elevational view of the electro-optic modulator device of FIG. 1.

In the form of the invention illustrated in FIGS. 1 and 2, an electro-optical modulator device 10 comprises a light energy conducting waveguide film 12 that is disposed on a plane surface of a prismatic substrate 14. The waveguide film 12 in this embodiment is formed of a material having known electro-optic properties such as zinc oxide or of LNT (lithium/niobium/tantalate)(Li $Nb_xTa_{1-x}O_3$), or LNT, while the substrate 14 is formed of a lithium tantalate crystal (Li Ta $O_3$).

Mounted on the waveguide film, conveniently but not necessarily on the side thereof opposite the substrate, is an electrode structure 16. The electrode structure 16 is characterized by an electrically insulating film 18 and a matrix of interdigitated electrodes 16a and 16b connected by conductors 20,22 to a source 24 of modulating voltage.

The end surfaces 14a, 14b of the crystal substrate 14 are made at a predetermined angle $\theta$ to a plane parallel to the principal longitudinal light transmitting axis of the waveguide film 12. These end surfaces are preferably coated with a known non-reflective material.

Arranged on or in the end portions of the waveguide film 12 are coupling gratings 28a and 28b having line spacings determined in a manner that will be made apparent as this specification proceeds. Suffice it to say for the moment that light arriving at surface 14a along a path 30 is refracted so as to impinge at an angle $\phi$ with the normal to the grating 28a, and the grating 28a is effective to cause the light to be transmitted forwardly within the waveguide film to the coupling grating 28b. The latter is effective to direct the light at an angle $\phi'$ into the substrate 14 for refraction at surface 14b to form an exist beam along path 30'. By selecting $\theta$, $\theta'$ and $\phi$, $\phi'$, the entrance and exit beams can be rendered parallel or coaxial so that the device 10 is readily inserted into an optical system on line with an existing beam path. During its passage through the wave guide film, voltages applied to the modulator electrode structure 16 will effect desired modulation of the light so as to provide the modulated exit beam 30', 32 representing the deflected beam path.

The waveguide propogation vector $\beta$ may be defined as $$\beta = \frac{2\pi \, n_{\text{eff}}}{\lambda_o}, \tag{Eq. 1}$$

where $n_{\text{eff}}$ is the effective index of refraction of the waveguide 12, and light will be coupled into the waveguide when $$k_s \sin \phi + k_g = \beta, \tag{Eq. 2}$$

where $$k_s = \frac{2\pi \, n_s}{\lambda_o}, \text{ and } \frac{2\pi}{d},$$

where $n_s$ is the effective index of refraction of the substrate 14 and $d$ is the grating spacing. Thus, $$\frac{\lambda_o}{d} = n_{\text{eff}} - n_s \sin \phi, \tag{Eq. 3}$$

and $$\sin \phi = \sin \left( \theta + \arcsin \left( n_o \frac{\cos \theta}{n_s} \right) \right) \quad \text{(Eq. 4)}.$$

By using equations (3) and (4) an appropriate coupling grating space $d$ can be determined for a particular wavelength of light and selected angle $\theta$. For example, let $\theta$ be chosen to be 30° and the device 10 to operate with light at 6328 A. Consider the index $n_s$ of substrate 14 to be 2.181 and the effective index $n_{eff}$ of the waveguide film 12 to be 2.200. Taking $n_o$ for air or vacuum to be 1.0, then from Eq. (4) the angle $\phi = 53.4°$. From Eq. (3), $\lambda_o/d = 0.449$ and $d = 1.409$ $\mu$m.

If the values for $\theta$, $\phi$ and $d$ are used for $\theta'$, $\phi'$ and $d$ of the grating 28b, respectively, the exit beam path 30' will be parallel to the entrance path 30. Of course, if it is desired to have the exit beam not parallel to the entrance beam, other appropriate values can be calculated in a similar manner.

Figure 3:
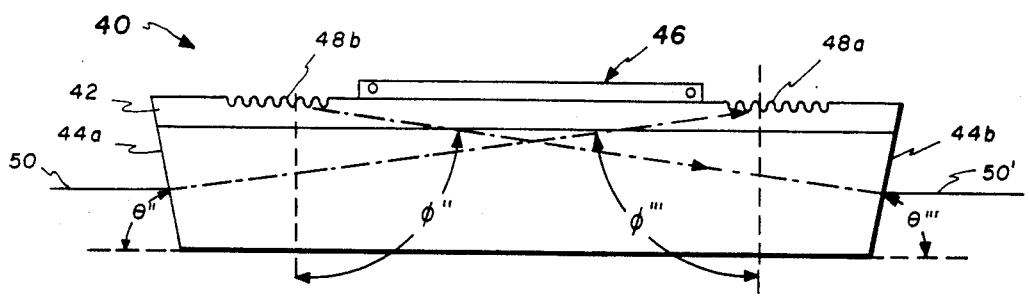
FIG. 3 is a side elevational view of another electro-optic modulator device embodying the invention.

Referring now to FIG. 3, another embodiment of the invention is shown wherein a modulator device 40 utilizes backward grating coupling into the wave guide film. This is known to be more efficient than forward coupling. In accordance with the invention, the device 40 comprises a waveguide film 42 supported by a prismatic substrate 44, and a modulating electrode means 46, corresponding to elements 12, 14, and 16, respectively, of device 10. The end faces 44a and 44b make angles $\theta$ and $\theta'$ with the longitudinal surface of the prismatic substrate 14. In this embodiment however, entrance and exit coupling gratings 48a and 48b are reversed relative to the entrance and exit coupling gratings 28a and 28b of the device 10.

Thus, light entering along entrance beam path 40 is refracted to impinge on the entrance coupling grating 48a at the far end of the device 40, and travels within the waveguide 42 in a backward direction, relative to the entrance beam, toward the exit coupling grating 48b. The beam is directed by the grating 48b within the substrate 44 toward fac 44b, where it is again refracted to emerge as an exit beam along path 40'. Angles $\phi$ and $\phi'''$ correspond to angles $\phi$ and $\phi'$ in the prior example. The reversed waveguide propagation vector may be expressed as $$-\beta = k_s \sin \phi - k_{g} \text{ or}$$

$$\frac{\lambda_o}{d} = n_s \sin \phi + n_{eff} \quad \text{(Eq. 5)}$$

The device 40 using backward coupling will require a smaller grating space $d$ than the device 10 using forward coupling for light of the same wavelength. Of course, the surfaces 44a and 44b, like faces 14a, 14b, may advantageously be coated with an anti-reflection coating.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. An electro-optic modulator device comprising:
   a waveguide film having substantially parallel plane surfaces and characterized by electro-optic properties;
   first and second gratings formed in one of said plane surfaces of said waveguide and adjacent opposite ends thereof;
   electrode means, disposed against said one of said plane surfaces of said waveguide film between said first and second gratings, for subjection of said waveguide film to varying electrical fields;
   a prismatic refractive substrate having a plane surface disposed against the other of said plane surfaces of said waveguide, said substrate having opposite plane end faces disposed at pedetermined angles to the longitudinal axis of said substrate, whereby a beam of light travelling along a predetermined entry axis parallel to said parallel plane surfaces and entering said substrate through one of said end faces is refracted to impinge on said first grating so as to be propagated within said waveguide film toward said second grating by which the light is directed to said second end face for refraction and exit from said substrate along an exit axis that is aligned with said entry axis.

2. An electro-optic modulator device as defined in claim 1, and wherein:
   said one of said end faces is adjacent said first grating, said other of said end faces is adjacent said second grating, and said propagation of said light in said waveguide film is in a forward direction relative to said beam of light entering said substrate.

3. An electro-optic modulator device as defined in claim 1, and wherein:
   said one of said end faces is adjacent said second grating, said other of said end faces is adjacent said first grating, and said propagation of light in said waveguide film is in a backward direction relative to said beam of light entering said one end face of said substrate and exiting said other end face thereof.

4. An electro-optic modulator as defined in claim 2, and wherein:
   said waveguide film comprises $\text{Li Nb}_x \text{Ta}_{1-x} \text{O}_3$, and said substrate comprises $\text{Li Ta O}_3$.

5. An electro-optic modulator as defined in claim 3, and wherein said waveguide film comprises $\text{Li Nb}_x \text{Ta}_{1-x} \text{O}_3$.

* * * * *